United States Patent [19]
Mullet et al.

[11] Patent Number: 5,638,523
[45] Date of Patent: Jun. 10, 1997

[54] METHOD AND APPARATUS FOR BROWSING INFORMATION IN A COMPUTER DATABASE

[75] Inventors: Kevin Mullet, Mountain View; Darrell Sano, Oakland, both of Calif.

[73] Assignee: Sun Microsystems, Inc., Mountain View, Calif.

[21] Appl. No.: 556,638

[22] Filed: Nov. 13, 1995

Related U.S. Application Data

[63] Continuation of Ser. No. 9,032, Jan. 26, 1993, abandoned.

[51] Int. Cl.⁶ .................................................. G06F 17/00
[52] U.S. Cl. ..................... 395/326; 395/340; 395/349; 395/357; 345/127; 345/130; 345/131
[58] Field of Search ................................. 395/155–166; 345/113, 115, 118, 127, 129–131

[56] References Cited

U.S. PATENT DOCUMENTS

| | | | |
|---|---|---|---|
| Re. 32,632 | 3/1988 | Atkinson | 340/709 |
| 4,533,910 | 8/1985 | Sukonick | 340/721 |
| 4,555,775 | 11/1985 | Pike | 364/900 |
| 4,622,545 | 11/1986 | Atkinson | 340/747 |
| 4,748,618 | 5/1988 | Brown | 370/94 |
| 4,772,882 | 9/1988 | Mical | 340/709 |
| 4,785,408 | 11/1988 | Britton | 364/513.5 |
| 4,812,834 | 3/1989 | Wells | 340/721 |
| 4,847,604 | 7/1989 | Doyle | 340/706 |
| 4,884,223 | 11/1989 | Ingle | 364/550 |
| 4,899,136 | 2/1990 | Beard | 340/706 |
| 4,914,732 | 4/1990 | Henderson | 340/825 |
| 4,931,783 | 6/1990 | Atkinson | 340/710 |
| 4,935,865 | 6/1990 | Rowe | 364/188 |
| 4,939,507 | 7/1990 | Beard | 340/706 |
| 5,062,060 | 10/1991 | Kolnick . | |
| 5,065,347 | 11/1991 | Pajak et al. | 395/159 |
| 5,072,412 | 12/1991 | Henderson | 395/159 |
| 5,155,806 | 10/1992 | Hoeber et al. | 395/157 |
| 5,157,768 | 10/1992 | Hoeber et al. | 395/157 |
| 5,283,865 | 2/1994 | Johnson | 395/161 |

FOREIGN PATENT DOCUMENTS

| | | |
|---|---|---|
| 0239884 | 10/1987 | European Pat. Off. . |
| 11359299 | 7/1970 | United Kingdom . |

OTHER PUBLICATIONS

Ishii, Hiroshi, Arita, Kazuho; "Clearface: Translucent Multiuser Interface for Team Workstation", ECSCW, Sep. 1991, pp. 6–10.

*Microsoft Windows User's Guide v30*, Microsoft Corp., 1985–1990, pp. 108–111, 305.

Alexander, Visualizing cleared–off desktops, *Computer-World*, May 6, 1991, p. 20.

(List continued on next page.)

*Primary Examiner*—Kee M. Tung
*Assistant Examiner*—U. Chauhan
*Attorney, Agent, or Firm*—Blakely Sokoloff Taylor & Zafman LLP

[57] ABSTRACT

A method and apparatus for browsing through a computer database on a computer system with a graphical user interface. The information to be browsed is displayed on a display screen. A browsing tool which resembles a magnifying glass is displayed on the display screen on top of the information. The browsing tool has a viewing lens with targeting crosshair and a "magnifying" reticle. When the browsing tool is moved about the screen, the information on the screen is shown in normal form. When the browsing tool comes to a rest, the information within the viewing lens of the browsing tool is modified depending on the current browsing tool mode. When the browsing tool is in magnification mode, the information within magnifying reticle is enhanced such that it fills the entire viewing lens of the browsing tool. When the browsing tool is in hierarchical browsing mode, the next lower level of the hierarchy is displayed within the viewing lens of the browsing tool. When the browsing tool is in data filtering mode, the information is displayed according to a preset filtering rule.

28 Claims, 9 Drawing Sheets

OTHER PUBLICATIONS

Hiroshi Ishii, Naomi Miyaka, Toward an Open Shared Workspace, *Communications of the ACM,* Dec., 1991, vol. 34, No. 12, pp. 37–50.

Article entitled: Learning Considerations in User Interface Design: The Room Model; author: Patrick P. Chan; publication of the Software Portability Laboratory, University of Waterloo, Waterloo, Ontario, Canada, Jul., 1984.

Article entitled: Creation/Modification of the Audio Signal Processor Setup For A PC Audio Editor; publication of International Business Machines, IBM Technical Disclosure Bulletin, vol. 30, No. 10, Mar. 1988.

Article entitled: Browsing Within Time–Driven Multimedia Documents; authors: Stavros Christodoulakis and Steven Graham; publication of the Institute for Computer Research, University of Waterloo, Waterloo, Ontario, Canada, Jul., 1988.

Article entitled: Impact: An Interactive Natural–Motion–Picture Dedicated Multi–Media Authoring System; authors: Hirotada Ueda, Takafumi Mityatake, and Satoshi Yoshizawa; Communications of the ACM, Mar., 1991, pp. 343–350.

User Interface in the 90's; author: Charles Ottino, Advances in Instrumentation and Control, vol. 47, No. 2, 1992, Research Triangle Park US.

A Visual Approach to Browsing in a Database Environment; author: James A. Larson, Computer, vol. 19, No. 6, Jun., 1986, Long Beach US, pp. 62–71.

Figure 1

FIG_2A

FIG_2B

FIG_2C

FIG_2D

FIG_3A

FIG_3B

FIG_3C

FIG_3D

FIG_3E

FIG_4A

[1] INTRODUCTION
[2] THESIS
[3] BODY
[4] SUMMARY
[5] CONCLUSION
[6] BIBLIOGRAPHY

FIG_4B

FIG_5A

FIG_5B

FIG_6A

FIG_6B

FIG_7

FIG_8A

FIG_8B 5,638,523

METHOD AND APPARATUS FOR BROWSING INFORMATION IN A COMPUTER DATABASE

This is a continuation of application Ser. No. 08/009,032, filed Jan. 26, 1993, now abandoned.

BACKGROUND OF THE INVENTION

1. Field of the Invention

This invention relates to the field of graphical user interfaces for computer systems. More particularly, to a method and apparatus for providing an intuitive way for an operator to browse through information stored in a computer database.

2. Art Background

Historically, humans have interfaced with computers through a system of discrete commands which typically comprise a combination of both text and mathematical symbolic characters. Examples of such systems are numerous and include the programming languages of FORTRAN, ALGOL, BASIC, etc., which transform an operator's written program into machine executable "object" code and the command shells of UNIX and MS-DOS which interact with the operator using a set of typed commands. However, the ease with which a operator becomes proficient in programming or interacting with a computer-based system is generally a function of how close the system models the logical thought of the operator himself. If the operator is able to enter commands in the order in which he would find most logically appropriate, rather than having to transpose his desired command into the code of a programming language, greater operator efficiency in using the system is achieved.

A number of systems which have been developed to minimize the learning or acclamation period which a operator must go through to become proficient in the interaction with the computer system are referred to as "object oriented systems". A common object oriented interface approach utilizes multiple "windows" displayed on a cathode ray tube (CRT) in which combinations of text and graphics are used to convey information. Each window may take the form of an object such as a file folder, different operating environment, pages or layered bit maps to provide a separate display of video information in independent screen regions. (See, for example, Robson, "Object Oriented Software Systems", Byte, August, 1981; and U.S. Pat. Nos. 4,414,628; 4,533,910; 4,450,442; 4,555,775 and 4,622,545, and L. Tesler, "The Small Talk Environment", Byte, August, 1981, Volume 6, No. 8.)

The use of modern computer systems incorporating object oriented window environments may be applied to browse through large databases. For example, the information in a database can be placed into object form and displayed on a graphical screen. An operator could then browse through the database by selecting the objects displayed on the screen.

In order to efficiently browse through the information displayed on the screen, the operator should be provided with browsing tools which are easy to use. The present invention addresses this need by providing an intuitive browsing tool for browsing through information displayed on graphical screen.

SUMMARY OF THE INVENTION

The present invention provides a useful method and apparatus for browsing through computer databases using a computer system with a graphical user interface. The information to be browsed through is displayed on a display screen. A browsing tool which resembles a magnifying glass is displayed on the display screen such that it appears on top of the information. The browsing tool has a viewing lens with targeting crosshair and a magnifying reticle. When an operator moves the browsing tool across the display screen, the browsing tool displays the information in the viewing area in normal form. When the browsing tool remains stationary for a predetermined amount of time, the information within the viewing lens of the browsing tool is modified depending on the current mode of the browsing tool. When the browsing tool is in a magnification mode, the information within the "magnifying" reticle is enhanced such that it fills the entire viewing lens of the browsing tool. When the browsing tool is in a hierarchical browsing mode, the next lower level of the hierarchy is displayed within the viewing lens of the browsing tool. When the browsing tool is in a data filtering mode, the information is displayed according to a preset filtering rule.

BRIEF DESCRIPTION OF THE DRAWINGS

The objects, features, and advantages of the present invention will be apparent to one skilled in the art in view of the following detailed description in which:

FIG. 4a illustrates a typical written outline.

FIG. 4b illustrates the browsing tool of the present invention on the written outline of FIG. 4a with the viewing area enhanced to reveal outline subtopics.

FIG. 5a illustrates a simple state diagram.

FIG. 5b illustrates the browsing tool of the present invention on a state in the state diagram of FIG. 5a with the viewing area enhanced to reveal substates.

FIG. 6a illustrates a simple corporate organizational chart.

FIG. 6b illustrates the browsing tool of the present invention on the manufacturing department of the corporate organizational chart in FIG. 6a with the viewing area enhanced to reveal a department organizational chart revealing the members of the manufacturing department.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

A browsing tool for browsing information stored in a computer database is disclosed. In the following description, for purposes of explanation, specific nomenclature such as icons, displays, cursors, reticle, etc. is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Figure 1:
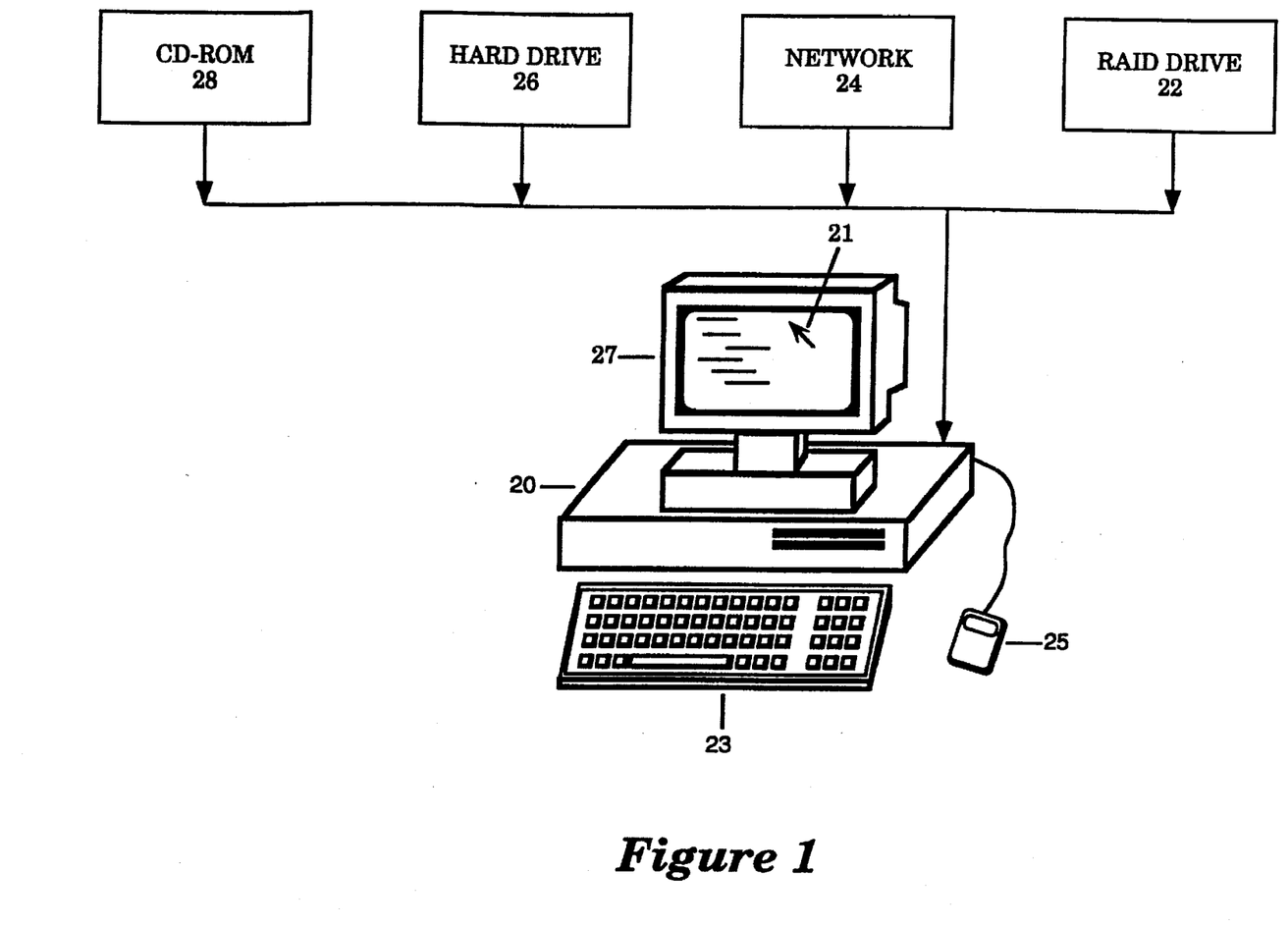
FIG. 1 illustrates a typical computer system which can use the browsing tool of the present invention.

FIG. 1 illustrates a typical computer system which can use the browsing tool of the present invention. The computer system consists of a central processing unit 20, a graphical display screen 27, input devices 23 and 25, and data storage devices 22, 24, 26, and 28. A cursor 21 is rendered on the display screen 27. The cursor 21 is used by an operator to select and position objects on the display screen 27. The operator positions the cursor 21 around the display screen 27 using a cursor control device 25. The data storage devices provide information to the central processing unit 20.

Figure 2A:
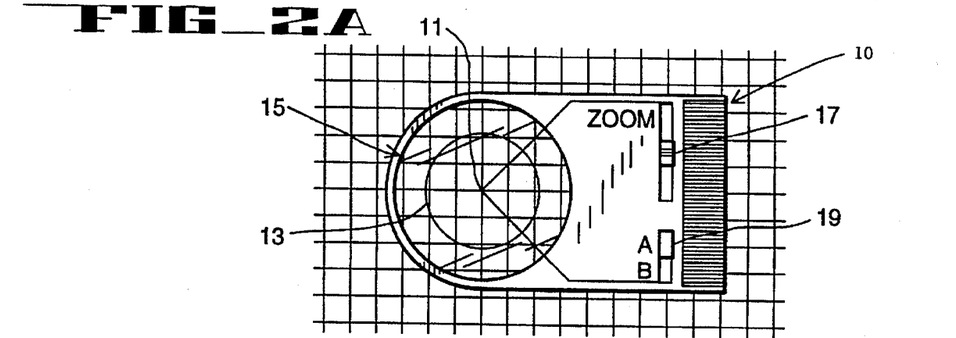
FIG. 2a illustrates the browsing tool of the present invention.

FIG. 2a illustrates the browsing tool 10 of the present invention. The browsing tool 10 has a viewing lens 15 which is used for viewing information presented on the display screen. The viewing lens 15 is adjustable such that an operator can create a larger browsing tool 10. Within the viewing lens 15 is a crosshair 11. Crosshair 11 is used for "targeting" objects within the viewing lens 15. Also within the viewing lens 15 is a "magnifying" reticle 13. The magnifying reticle 13 is used to mark an area within viewing lens 15 which will be enhanced by the browsing tool 10 when the browsing tool 10 is in the magnification mode.

The viewing lens 15 has a slightly translucent tint which makes the information within the viewing lens 15 appear slightly hazy. By making the viewing lens 15 slightly translucent the metaphor of a magnifying lens is reinforced in the mind of an operator. Furthermore, the translucent tint of the viewing lens 15 increases the visual prominence of the crosshair 11 and the magnifying reticle 13 by providing a sharp contrast between these two elements and the information within the viewing lens 15.

The browsing tool 10 is rendered on the graphic display screen 27 such that it appears over the database information to be browsed through. An operator selectively positions the browsing tool 10 on the display screen 27 by moving the cursor 21 using the cursor control device 25. While the operator moves the browsing tool 10 across the display screen 27, the information within the viewing area 15 is not affected. When the operator ceases moving the browsing tool 10 and the browsing tool 10 remains stationary for a predetermined amount of time, the information within the viewing area 15 is enhanced depending upon which mode the browsing tool 10 is in.

The browsing tool 10 can be used to browse through computer database information using three different modes: a "magnification" mode, a hierarchical browsing mode, and a data filtering mode. When in the magnification mode, the browsing tool 10 enhances the information within the magnifying reticle 13 such that the information is presented in greater detail. When browsing tool 10 is in the hierarchical browsing mode, the browsing tool 10 reveals the next lower hierarchical level of information within the viewing area 15. When in the data filtering mode the browsing tool 10 illustrates the information within the viewing area 15 as interpreted by a preset data filtering rule. Each browsing mode will be explained in detail.

Magnification Mode

The magnification mode of the browsing tool 10 is used to provide a more detailed view of the information displayed graphically on the display screen. When the browsing tool 10 is in the magnification mode, the browsing tool 10 enhances the information located within the magnifying reticle 13 such that the information fills the viewing area 15 of the browsing tool 10. The enhanced information is not simply enlarged, more detailed information not previously displayed becomes visible.

Referring to FIG. 2a, the browsing tool 10 is illustrated with a magnification adjustment slider 17 and a toggle switch 19. The magnification adjustment slider 17 is set by an operator using the cursor 21 on the display. The magnification adjustment slider 17 is adjusted to set the scale of the magnification. When the magnification adjustment slider 17 is adjusted by an operator, the magnifying reticle 13 continuously changes in size to reflect the area which will be enhanced. The smaller the magnifying reticle 13, the greater the enhancement will be. In some applications the database information can only be presented on the screen in a finite number of discrete "resolutions". In such applications the magnifying reticle 13 correspondingly changes size in discrete steps.

Figure 2B:
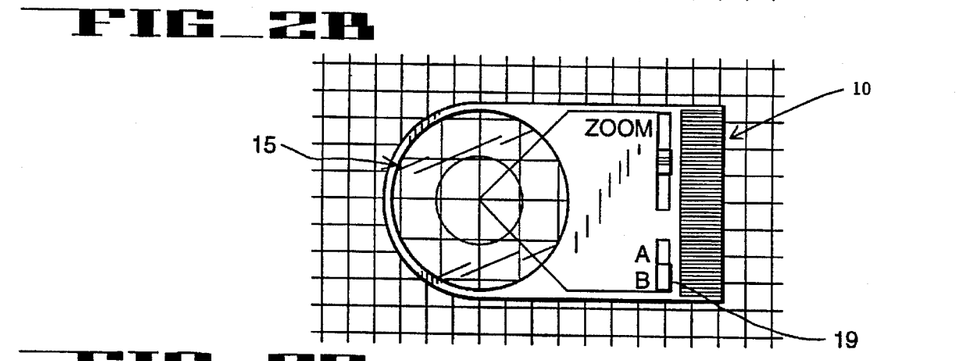
FIG. 2b illustrates the browsing tool of the present invention being used to enhance the information in magnifying.

FIGS. 2a, 2b, 2c, and 2d provide a simple example of the magnifying reticle 13 and the magnification adjustment slider 17 For example, referring to FIG. 2a, the magnification adjustment slider 17 has been set to a medium setting. The magnifying reticle 13 in FIG. 2a is sized to include all of the four center squares and most of the area of the surrounding squares. When the browsing tool 10 enhances the information within the magnifying reticle 13, as illustrated in FIG. 2b, the four center squares and most of the area of the surrounding squares are enhanced such that the four center squares and the surrounding area fill the entire viewing lens 15 area.

Figure 2C:
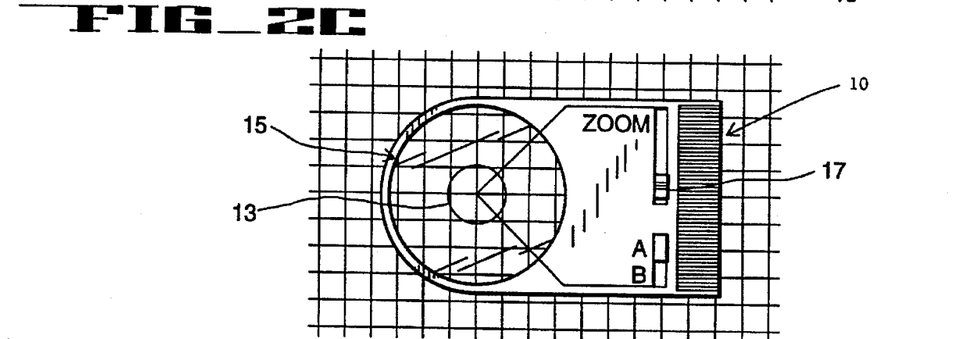
FIG. 2c illustrates the browsing tool of the present invention with the magnification adjuster adjusted to increase the level of enhancement.
Figure 2D:
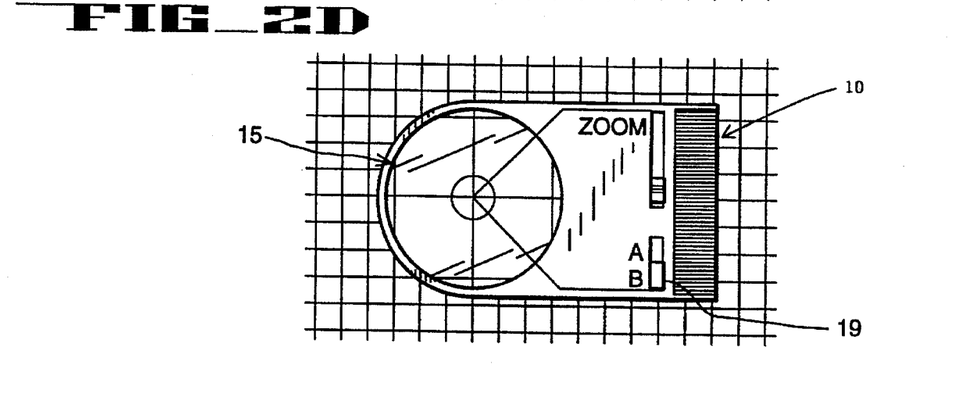
FIG. 2d illustrates the browsing tool of the present invention being used to enhance the information in greater detail than in FIG. 2b.

FIGS. 2c and 2d illustrate the browsing tool 10 with the enhancement scale increased. Referring to FIG. 2c, the browsing tool 10 is illustrated with the magnification adjustment slider 17 adjusted for greater enhancement. The magnifying reticle 13 is correspondingly smaller. The magnifying reticle 13 now contains only most of the four center squares. FIG. 2d illustrates the how the browsing tool 10 of FIG. 2c appears when the browsing tool 10 enhances the information within the magnifying reticle 13. The viewing area 15 in FIG. 2d contains only the four center squares. This is an enhanced version of the area within the magnifying reticle 13 in FIG. 2c.

Figure 3A:
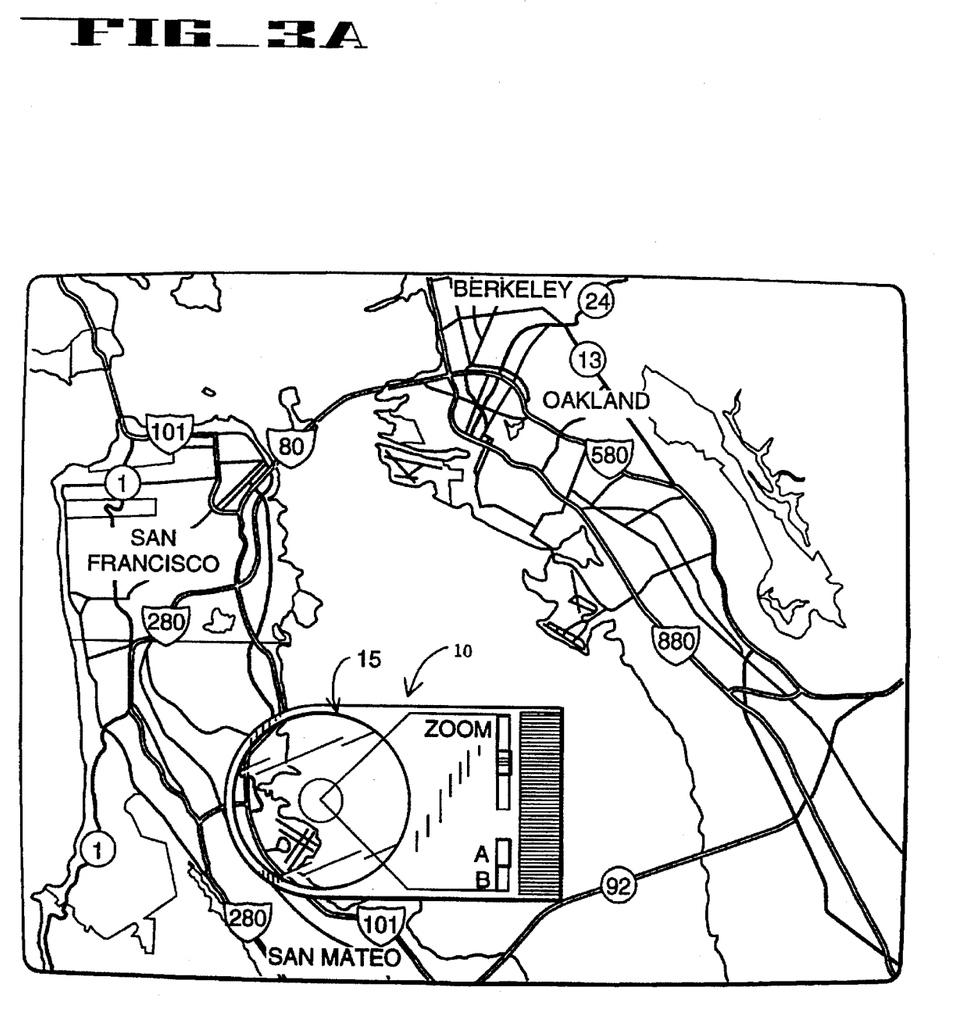
FIG. 3a illustrates the browsing tool of the present invention on a map of the San Francisco bay area.

Referring to FIG. 3a, the browsing tool 10 is illustrated on a display screen showing a map of the San Francisco Bay Area. An operator selectively positions the browsing tool 10 on the display screen using a cursor control device to select any area on the map to view in detail. The system can be implemented such that when the browsing tool 10 is moved near the edge of the display screen, the contents of the display screen "scrolls" over to reveal additional map information not previously visible.

As depicted in FIG. 3a, the information within the browsing tool's viewing lens 15 area is not enhanced while the browsing tool 10 is moved across the display screen. The information within the browsing tool's viewing lens 15 area is not enhanced so an operator can easily position the browsing tool 10 in order to choose an area to view in detail. The nonenhanced viewing area 15 therefore acts like a "spotting scope" on a telescope. The operator places the area that he wishes to view in detail within the magnifying reticle 13 within the viewing area 15. After the browsing tool 10 remains stationary for a predetermined amount of time, the area within the magnifying reticle 13 becomes enhanced.

Alternatively, the toggle switch 19 can be toggled to place the browsing tool 10 in a permanent magnification mode such that the contents in viewing area 15 is always enhanced.

Figure 3B:
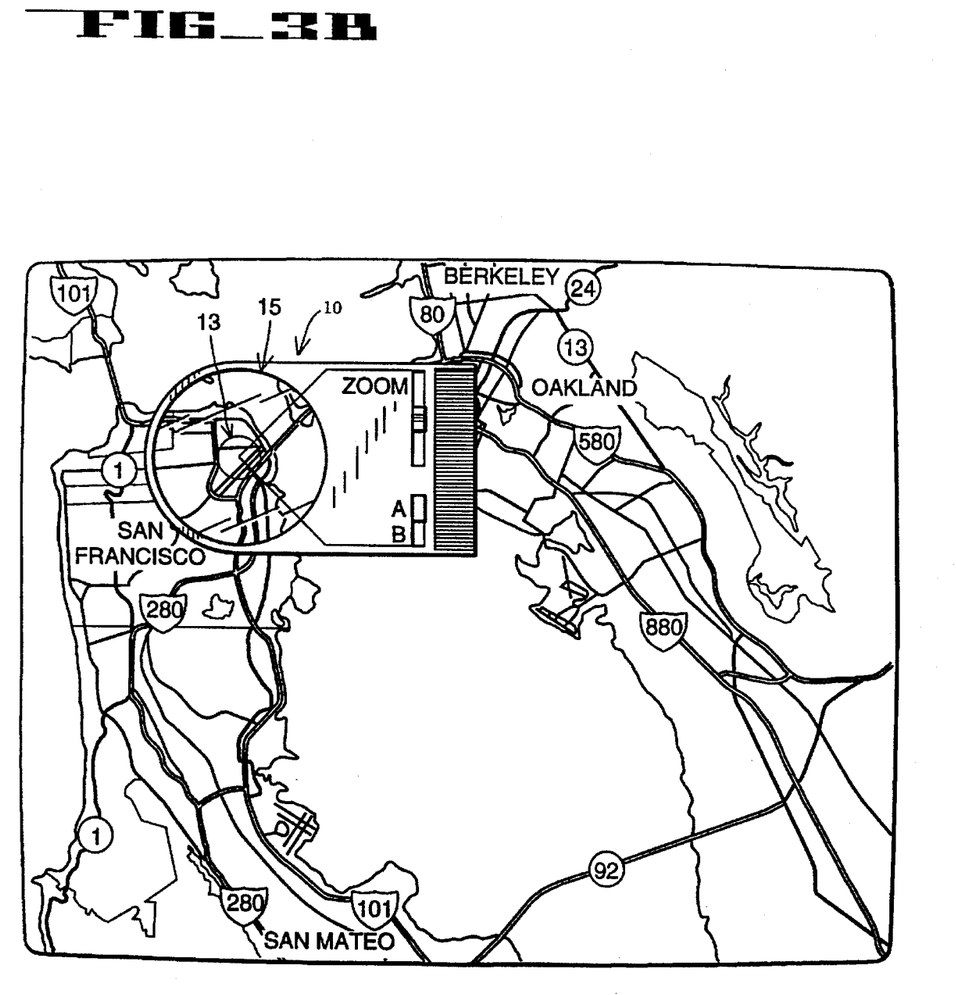
FIG. 3b illustrates the browsing tool of the present invention on a map of the San Francisco bay area with the reticle focused on downtown San Francisco.
Figure 3C:
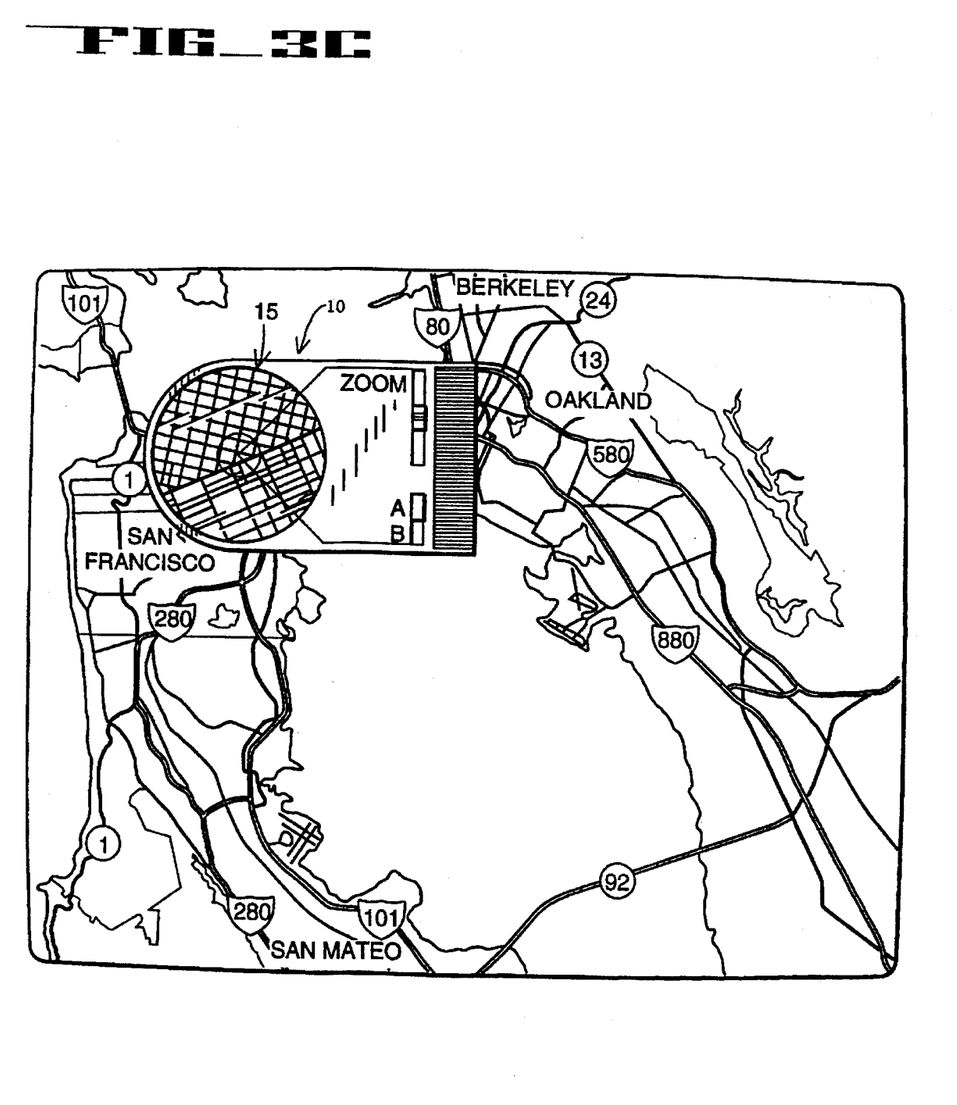
FIG. 3c illustrates the browsing tool of the present invention on a map of the San Francisco bay area with the viewing lens enhancing part of downtown San Francisco.

In FIG. 3b, an operator positioned the browsing tool 10 onto the city of San Francisco. By ceasing to move the browsing tool for a predetermined period of time, the contents in viewing area 15 becomes enhanced. FIG. 3c illustrates the browsing tool on San Francisco after the browsing tool 10 has remained stationary for a predetermined time period.

Figure 3D:
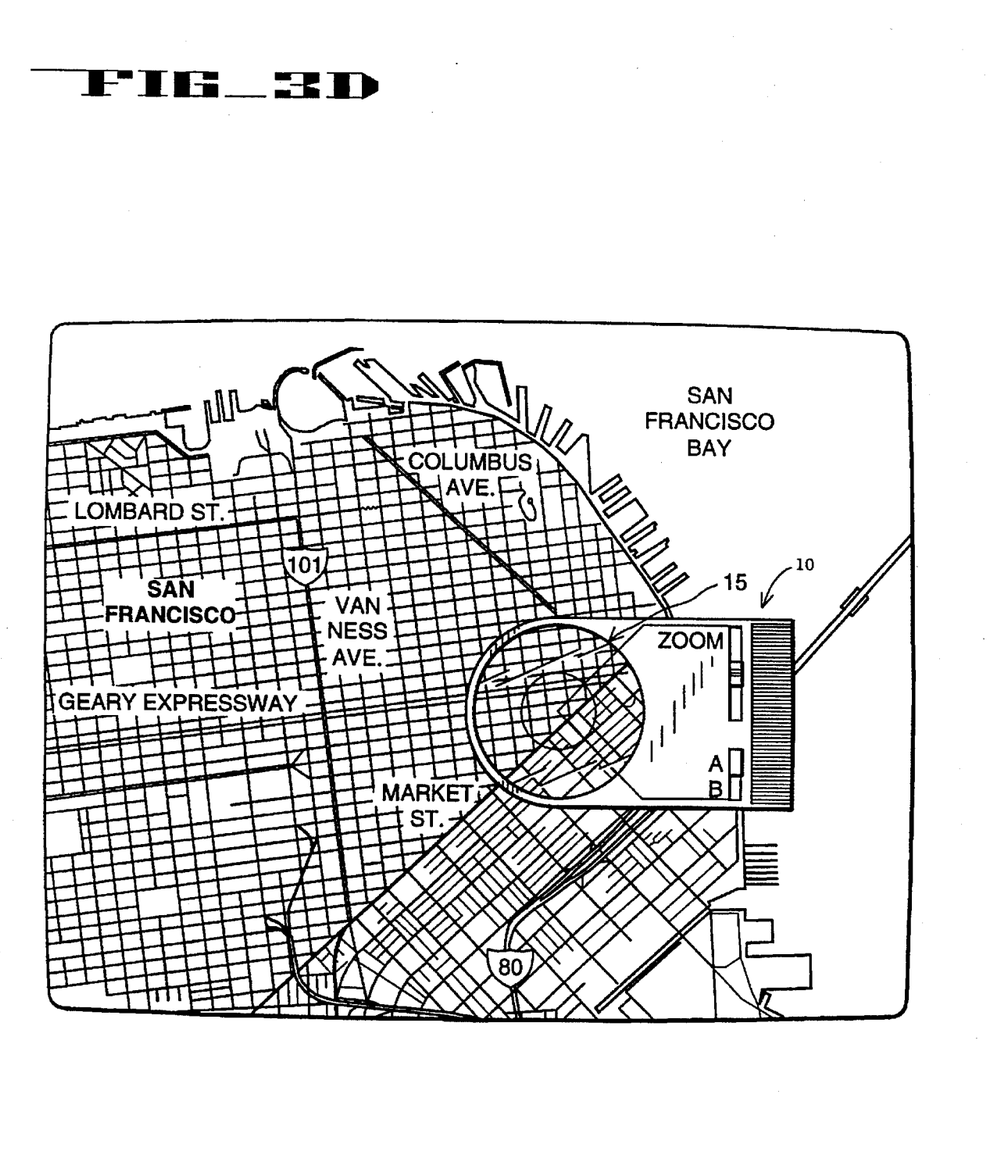
FIG. 3d illustrates the browsing tool of the present invention on a map of downtown San Francisco with the reticle focused on the intersection of Market Street and Montgomery Street.

Referring to FIG. 3c, the viewing area 15 of the browsing tool 10 shows a small section of downtown San Francisco in enhanced form. If the enhanced area is the approximate area the operator would like to look at in detail, the operator can indicate that the entire screen should be used to show the enhanced view. FIG. 3d illustrates the screen appearance after the operator has elected to use the entire screen to view the enhanced view of San Francisco.

Figure 3E:
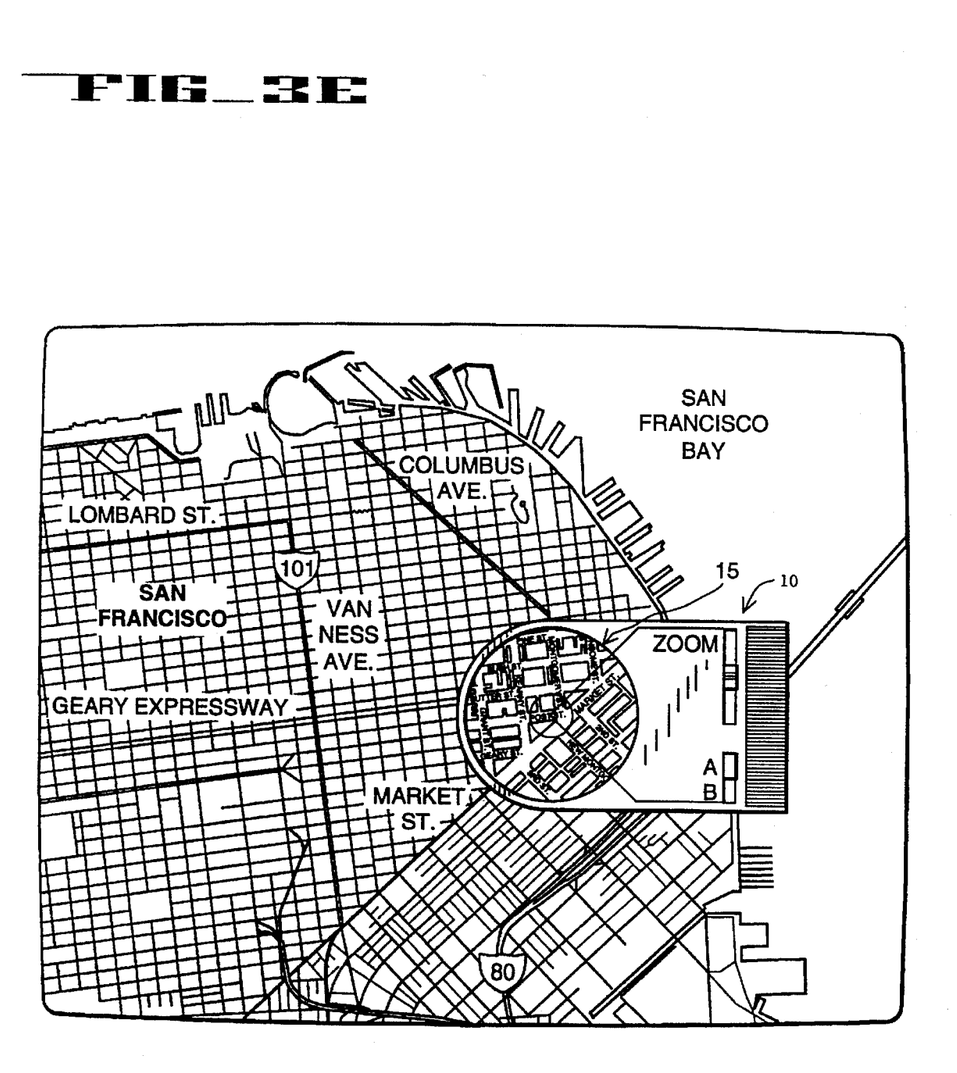
FIG. 3e illustrates the browsing tool of the present invention on a map of downtown San Francisco with the area around the intersection of Market Street and Montgomery Street displayed at a higher resolution.

Referring to FIG. 3d, the operator can now move the browsing tool 10 around the screen to select an area within downtown San Francisco to view in even further detail. Again, after the operator ceases moving the browsing tool 10 for a predetermined amount of time, the browsing tool 10 enhances the area within the viewing lens 15. Referring to FIG. 3e, the area around Market Street and Post Street is enhanced such that all the street names become visible. It will be apparent to one skilled in the art that additional enhancement levels can be displayed, as required by the Application. For example, particular buildings and addresses (e.g. 595 Market St.), or alternatively, the names of certain businesses or offices (e.g., BST&Z law offices), could be displayed.

Hierarchical Browsing Mode

One method of organizing information stored in a computer database is to arrange the information into a hierarchical format. In a hierarchical format the information is first broken into groups such that each member of the group has a common characteristic. The groups are further subdivided into subgroups where each member of the subgroup has another common characteristic. The subgroups are again further subdivided, and so on.

For example, most computer file systems are implemented using a hierarchical file structure. A hierarchical file system starts with a root directory. The root directory contains individual data files and several sub-directories. Each sub-directory stores additional data files and sub-sub-directories, and so on.

The browsing tool of the present invention can be placed in a hierarchical browsing mode in order to browse through databases organized in a hierarchical format. When the browsing tool is placed in the hierarchical browsing mode, the display screen initially shows the information from a first hierarchical level. An operator selectively positions the browsing tool on the display of the first hierarchical level of information to choose an area to view in detail. When the operator ceases moving the browsing tool across the screen, the viewing area 15 is modified to display the next lower hierarchical level of information. If the operator is interested in the next lower hierarchical level information displayed in the viewing lens, the operator can request a full screen view of the next lower hierarchical level. The browsing tool thus allows the operator to "look-ahead" at the next hierarchical level of information before moving to it. Several examples are given below to show how the browsing tool is used to view hierarchical information.

FIG. 4a illustrates the top hierarchical level of a written outline. Each numbered item in the written outline has several sub-items which are stored in the next hierarchical level of the outline database. To view the outline sub-items for a particular outline item, an operator simply positions the browsing tool on top of the outline item. For example, if an operator desires to see the sub-items under the third outline item "body", the browsing tool is simply positioned over that outline item. When the operator ceases moving the browsing tool 10, the outline sub-items in the next hierarchical level of the outline database are displayed. FIG. 4b illustrates how the viewing area 15 of the browsing tool appears when the browsing tool 10 has been positioned over of the third outline item "body". Note that the viewing area 15 in of the browsing tool 10 in FIG. 4b is rectangular. The viewing area 15 can be any shape which best suits the particular application.

Referring now to FIG. 5a, a small state diagram is illustrated. Each of the individual states (A, B, C, D, and E) in the state diagram have sub-states. Therefore the state diagram of FIG. 5a represents only the top-level of a hierarchical state diagram. The sub-states for each of the individual states (A, B, C, D, and E) are stored in a lower hierarchical level. To view the sub-states of a particular state, an operator positions the browsing tool 10 over the particular state. FIG. 5b illustrates how the viewing area 15 of the browsing tool appears when the browsing tool 10 has been positioned over state C of FIG. 5a to reveal the sub-states (C1, C2, C3, and C4).

FIG. 6a illustrates a corporate department organization chart. The corporate organization chart illustrates the command and control relationships between various corporate departments. Within each corporate department illustrated in FIG. 6a there is an internal staff organization. The internal staff organization chart stored is in a lower hierarchical level. To view the staff organization chart for a particular department, an operator positions the browsing tool 10 over the box for the corporate department. For example, to see the staff organization of the Manufacturing department, an operator simply positions the browsing tool 10 over the box marked "Manufacturing". FIG. 6b illustrates how the viewing area 15 of the browsing tool 10 appears after the browsing tool 10 has been positioned over the Manufacturing department box.

Data Filtering Mode

Computer databases often contain such a large amount of information that the amount of information can overwhelm an operator. For example, if a city street map, a city sewer line map, and a map of all the public transportation routes available in the city are displayed simultaneously on a screen display, the display will appear cluttered and difficult to read.

To simplify a database with a large amount of information, the information can be divided into several "layers". In the example of the previous paragraph, the information could be divided into a city street data layer, a city sewer line data layer, and a public transportation route data layer. When displaying such data on a screen display, only one data layer should be displayed at a time so the screen does not become cluttered.

In such "layered" databases the browsing tool of the present invention can be used to combine the data layers without cluttering the screen. For example the browsing tool of the present invention can be used as a "filter" which only allows certain data through or allows different information through. An example of this technique is presented in FIG. 7.

Figure 7:
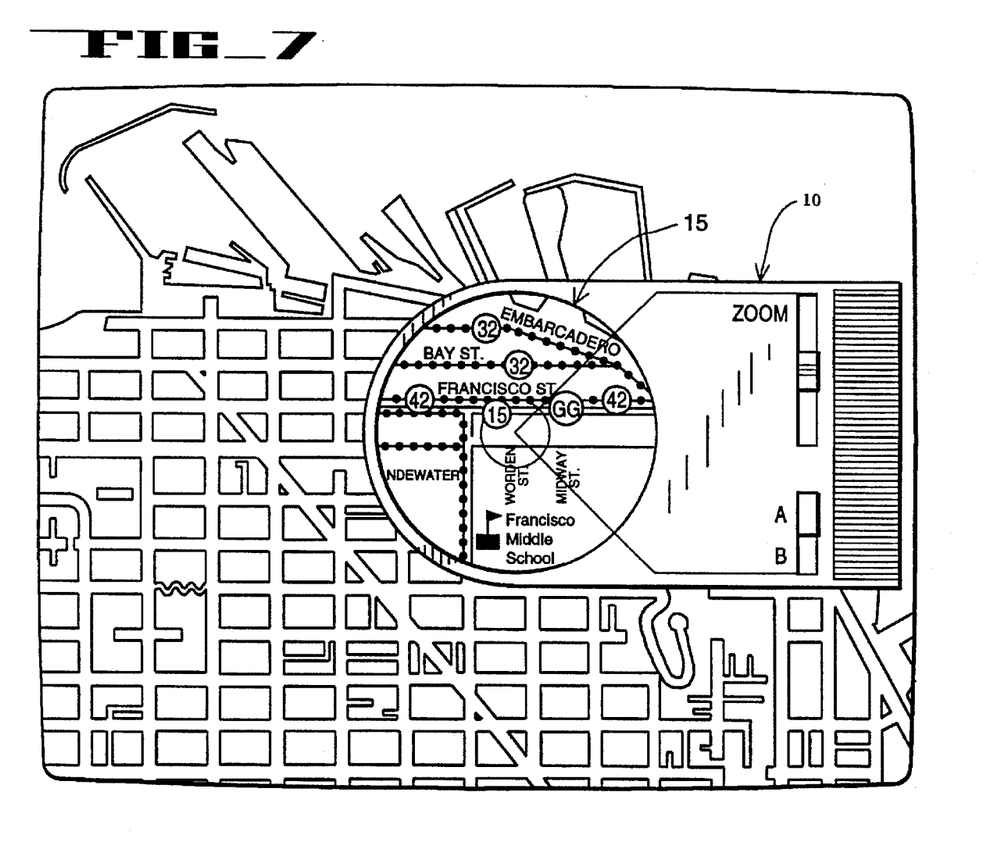
FIG. 7 illustrates the browsing tool of the present invention on a map of the Fisherman's Wharf district of San Francisco where the public transportation routes are revealed.

Referring to FIG. 7, a street map of San Francisco's Fisherman's Wharf district is displayed on a graphics screen display. An operator viewing the street map can pick a destination. After the operator has chosen a destination, the operator positions the viewing lens 15 of the browsing tool 10 onto the destination to reveal the public transportation routes which service the chosen destination. FIG. 7 illustrates a browsing tool 10 with the viewing lens 15 placed on and Francisco streets. The browsing tool 10 displays the 32 bus, 15 bus and 42 bus routes within the viewing lens 15. In the data filter mode, the magnifying reticle 13 is not used.

Figure 8A:
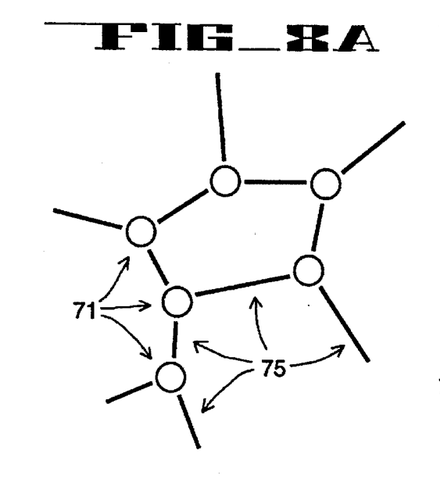
FIG. 8a illustrates a simple telephone system trunk line network.
Figure 8B:
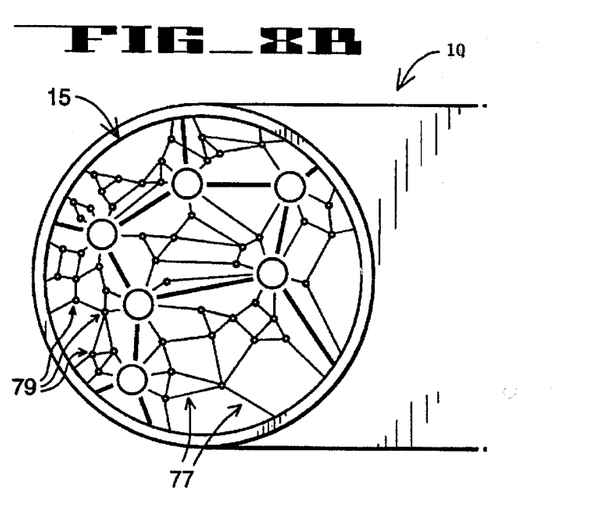
FIG. 8b illustrates the browsing tool of the present invention revealing the smaller lines and smaller switching stations connected to the simple telephone system trunk line network.

FIGS. 8a and 8b illustrate a second example of the browsing tool used as a database filter. FIG. 8a illustrates backbone of a telephone network system. The telephone network system backbone of FIG. 8a is comprised of central switching offices 71 and trunk lines 75. The browsing tool 10 can be set to use filtering rule which requests all smaller lines and switching stations to be illustrated. When an operator positions the browsing tool 10 over the telephone network system as illustrated in FIG. 8b, the smaller switching substations 79 and connection lines 77 are revealed in the viewing area 15. Note that the central switching offices 71 and trunk lines 75 are not enlarged, since the browsing tool is being used to filter through additional information and not to enhance the information.

The foregoing has described a browsing tool for browsing information stored in a computer database. It is contemplated that changes and modifications may be made by one of ordinary skill in the art, to the materials and arrangements of elements of the present invention without departing from the spirit and scope of the invention.

We claim:

1. In a computer system having a database containing a plurality of data, an apparatus for browsing through said data in said database, said apparatus comprising the elements of:

a graphic display system;

display means for displaying a graphic representation of said data in said database on said graphic display system;

rendering means for rendering a moveable browsing tool on said graphic display system over said graphical representation of said data, said moveable browsing tool having a viewing area for viewing said graphic representation of said data, said viewing area having a magnification area disposed in said viewing area to selectively target a portion of said graphic representation of said data contained in said viewing area;

positioning means for an operator to position said moveable browsing tool on the graphic display system; and enhancement means for enhancing said graphic representation of said data within said magnification area of the moveable browsing tool immediately after said operator ceases positioning said moveable browsing tool for a predetermined amount of time, said enhancement means rendering an enhanced graphic representation of the data within the viewing area.

2. The apparatus for browsing as claimed in claim 1 wherein said positioning means comprises a cursor and a cursor control device.

3. The apparatus for browsing as claimed in claim 2 wherein said cursor control device comprises a computer mouse.

4. The apparatus for browsing as claimed in claim 1 wherein said magnification area comprises a magnifying reticle and said enhancement means enhances said graphic representation of the data within said magnifying reticle such that an enhanced graphic representation of data appears in said viewing area and comprises an enlarged copy of said graphic representation of the data within said magnifying reticle and provides additional information.

5. The apparatus for browsing as claimed in claim 4 wherein said moveable browsing tool resembles a magnifying glass.

6. The apparatus for browsing as claimed in claim 5 wherein the viewing area of said moveable browsing tool is translucent.

7. The apparatus for browsing as claimed in claim 1 wherein said database stores said data in a hierarchical format, said hierarchical format comprising successively deeper hierarchical levels of data, and said enhancement means comprises means for fetching a next deeper hierarchical level of the data in said viewing area; and means for displaying a graphic representation of said next deeper hierarchical level of data in said viewing area.

8. The apparatus for browsing as claimed in claim 1 wherein said enhancement means comprises means for setting a data filtering rule;

means for applying said data filtering rule to the data in said viewing area to generate a set of filtered data; and means for displaying said a graphic representation of the set of filtered data in said viewing area.

9. The apparatus as claimed in claim 1 wherein said magnification area is adjustable with respect to said viewing area, said adjustable magnification area capable of targeting specific areas of said graphic representation of data within said viewing area to be enhanced by said enhancement means.

10. The apparatus as claimed in claim 9 wherein said adjustable magnification area has a proportional size relationship with respect to a degree of enhancement of said targeted areas of said graphic representation of data within said adjustable magnification area.

11. A method of browsing information stored in a computer database on a computer system with a graphics display screen, said method comprising the steps of:

displaying said information from said computer database on said graphics display screen;

rendering a moveable browsing tool having a viewing area with a magnification area disposed therein on said graphics display screen over said information from said computer database;

positioning said moveable browsing tool on said graphics display screen in response to input signals from an operator, said information from said computer database visible in said viewing area allowing said operator to selectively target a portion of said information with said magnification area; and enhancing said information within said magnification area immediately after said operator ceases positioning said moveable browsing tool for a predetermined amount of time and displaying an enhanced image of said information in said viewing area of said moveable browsing tool.

12. The method of browsing information stored in a computer database as claimed in claim 11 wherein said step of positioning said browsing tool on said graphics display screen further comprises:

receiving input signals from a cursor control device;

rendering a cursor on said graphics display screen, said cursor positioned on said graphics display screen in response to said input signals from said cursor control device, said cursor used for selecting and positioning said moveable browsing tool on said graphics display screen.

13. The method of browsing information stored in a computer database as claimed in claim 12 wherein said cursor control device comprises a computer mouse.

14. The method of browsing information stored in a computer database as claimed in claim 11 wherein said step of rendering a moveable browsing tool further comprises drawing a magnifying reticle within viewing area of said moveable browsing tool defining said magnification area and wherein said step of enhancing said information within said magnification area further comprises rendering an enlarged image of the information within said magnifying reticle in said viewing area.

15. The method of browsing information stored in a computer database as claimed in claim 11 wherein said database stores said information in a hierarchical format said hierarchical format comprising successively deeper hierarchical levels of data, and said step of enhancing said information within said viewing area further comprises fetching a next hierarchical level of the information in said viewing area; and graphically displaying said next hierarchical level of the information in said viewing area.

16. The method of browsing information stored in a computer database as claimed in claim 11 wherein said step of enhancing said information within said viewing area further comprises:

setting a data filtering rule for said browsing tool applying said data filtering rule to the information in said viewing area to generate a set of filtered data; and displaying said set of filtered data in said viewing area.

17. The method of browsing information stored in a computer database as claimed in claim 11 wherein said step of positioning said moveable browsing tool further comprises adjusting said magnification area to target specific areas of said graphic representation of data within said viewing area to be enhanced by said enhancement means.

18. The method of browsing information stored in a computer database as claimed in claim 17 wherein said step of adjusting said magnification area further comprises creating a proportional size relationship between a size of said magnification area and a degree of enhancement of said targeted areas of said graphic representation of data within said adjustable magnification area.

19. A computer apparatus, said computer apparatus having a database containing a plurality of data, said apparatus comprising the elements of:

a graphic display system;

display means for displaying a graphic representation of said data from said database on said graphic display system;

rendering means for rendering a movable browsing tool on said graphic display system over said graphic representation of data, said movable browsing tool having a viewing area for viewing said graphic representation of said data, said viewing area having a magnification area disposed in said viewing area to selectively target a portion of said graphic representation of said data contained in said viewing area;

positioning means for an operator to position said movable browsing tool on the graphic display system; and enhancement means for enhancing the graphic representation of the data within the magnification area of the moveable browsing tool immediately after said operator ceases positioning said moveable browsing tool for a predetermined amount of time such that an enhanced graphic representation of the data from the database provides additional information in said viewing area.

20. The apparatus as claimed in claim 19 wherein said positioning means comprises a cursor and a cursor control device.

21. The apparatus as claimed in claim 20 wherein said cursor control device comprises a computer mouse.

22. The apparatus as claimed in claim 19 wherein said magnification area comprises a magnifying reticle and said enhancement means enhances the graphic representation of said data within said magnifying reticle such that an enhanced graphic representation in said viewing area comprises an enlarged version of said graphic representation of data within said magnifying reticle.

23. The apparatus as claimed in claim 19 wherein said moveable browsing tool resembles a magnifying glass.

24. The apparatus as claimed in claim 19 wherein the viewing area of said moveable browsing tool is translucent.

25. The apparatus as claimed in claim 19 wherein said database stores said data in a hierarchical format, said hierarchical format comprising successively deeper hierarchical levels of data, and said enhancement means comprises means for fetching a next deeper hierarchical level of the data in said viewing area; and means for displaying a graphic representation of said next deeper hierarchical level of data in said viewing area.

26. The apparatus as claimed in claim 19 wherein said enhancement means comprises means for setting a data filtering rule;

means for applying said data filtering rule to the data in said viewing area to generate a set of filtered data; and means for displaying a graphic representation of said next filtered level of the data in said viewing area.

27. The apparatus as claimed in claim 19 wherein said magnification area is adjustable with respect to said viewing area, said adjustable magnification area capable of targeting specific areas of said graphic representation of data within said viewing area to be enhanced by said enhancement means.

28. The apparatus as claimed in claim 27 wherein said adjustable magnification area has a proportional size relationship with respect to a degree of enhancement of said targeted areas of said graphic representation of data within said adjustable magnification area.

* * * * *